United States Patent [19]
Kelley et al.

[11] Patent Number: 5,448,141
[45] Date of Patent: Sep. 5, 1995

[54] ADJUSTABLE SPEED DRIVE FOR RESIDENTIAL APPLICATIONS

[75] Inventors: Arthur W. Kelley, Raleigh, N.C.; Mohab A. Hallouda, Cairo, Egypt; Aaron M. Jungreis, Raleigh, N.C.

[73] Assignee: North Carolina State University, Raleigh, N.C.

[21] Appl. No.: 210,554

[22] Filed: Mar. 18, 1994

[51] Int. Cl.⁶ .......................................... H02K 23/00
[52] U.S. Cl. ................... 318/254; 318/138; 318/439; 388/805
[58] Field of Search ............ 318/254, 138, 439, 801; 165/42; 388/805

[56] References Cited

U.S. PATENT DOCUMENTS

| | | | |
|---|---|---|---|
| 4,015,182 | 3/1977 | Erdman | 318/254 |
| 4,167,691 | 9/1979 | Sorensen et al. | 318/138 |
| 4,556,827 | 12/1985 | Erdman . | |
| 4,668,898 | 5/1987 | Harms et al. . | |
| 4,682,093 | 7/1987 | Murphy et al. . | |
| 4,859,921 | 8/1989 | Archer . | |
| 4,959,596 | 9/1990 | MacMinn et al. . | |
| 4,972,134 | 11/1990 | Getz et al. . | |
| 5,076,076 | 12/1991 | Payne . | |
| 5,125,067 | 6/1992 | Erdman | 318/138 |
| 5,221,881 | 6/1993 | Cameron . | |

Primary Examiner—William M. Shoop, Jr.
Assistant Examiner—Karen Masih
Attorney, Agent, or Firm—Bell, Seltzer, Park & Gibson

[57] ABSTRACT

The present invention relates to a method and apparatus for controlling the speed of an electronically commutated motor. Such motors typically include a rotor, a stator coil, and an electronic commutator for controlling electrical power flow from an electrical power source of predetermined frequency to the stator coil. The invention includes the steps of generating a switch control signal responsive to a position of the rotor; generating a phase gating signal from the electrical power source of predetermined frequency, the phase gating signal having twice the predetermined frequency and having transitions in timed relation to the zero crossings of the electrical power source; varying the timed relation of the phase gating signal in accordance with an operational parameter desired for the electronically commutated motor; generating a phase controlled switch signal which is responsive to the phase gating signal and the switch control signals; and applying the phase controlled switch signal to the electronic commutator to control the electronic commutator, thereby controlling the speed of the electronically commutated motor.

36 Claims, 9 Drawing Sheets

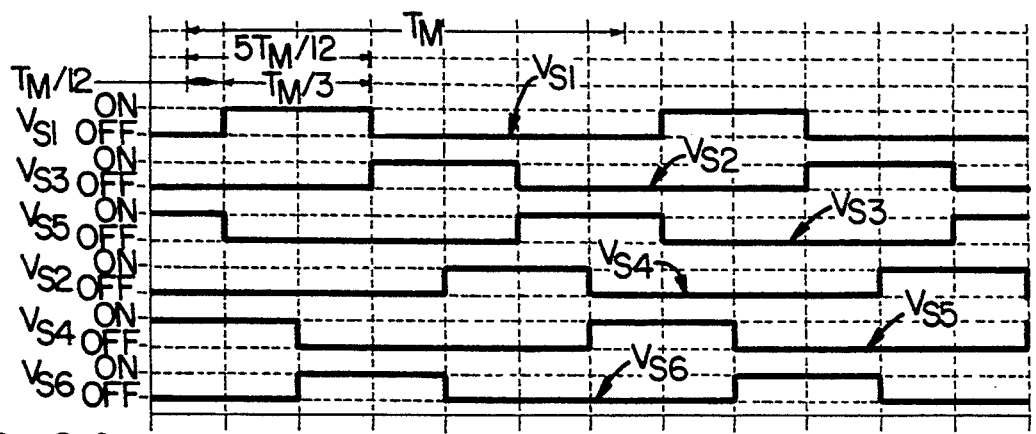
FIG. 2A.
(PRIOR ART)
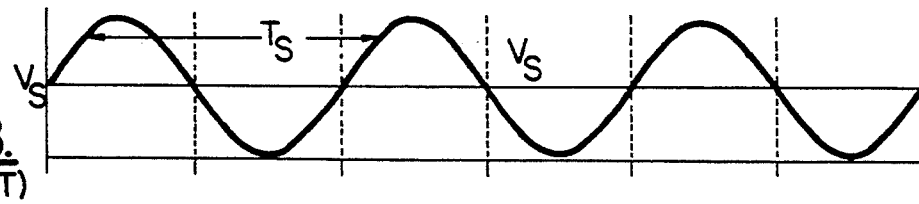
FIG. 2B.
(PRIOR ART)
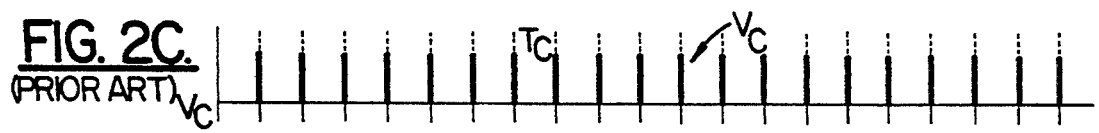
FIG. 2C.
(PRIOR ART) $V_C$
FIG. 2D.
(PRIOR ART) $V_D/V_M$
FIG. 2E.
(PRIOR ART) $V_{PWM}$
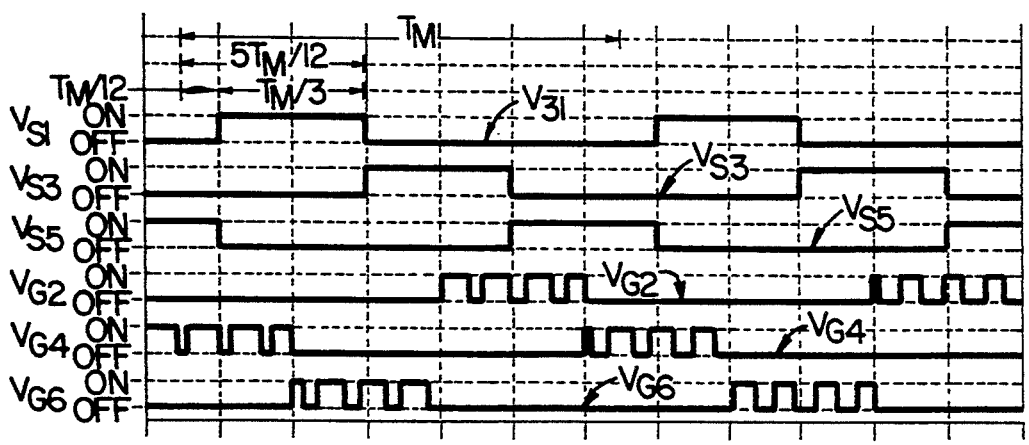
FIG. 2F.
(PRIOR ART)

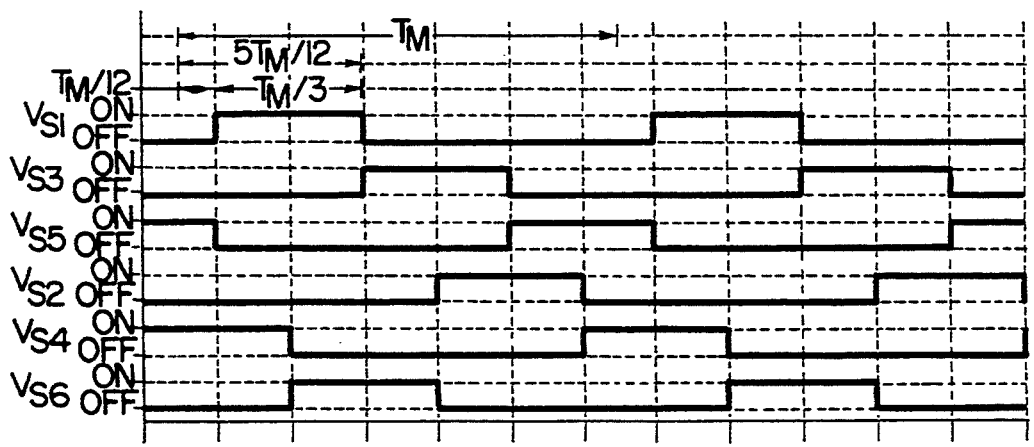
FIG. 8A.
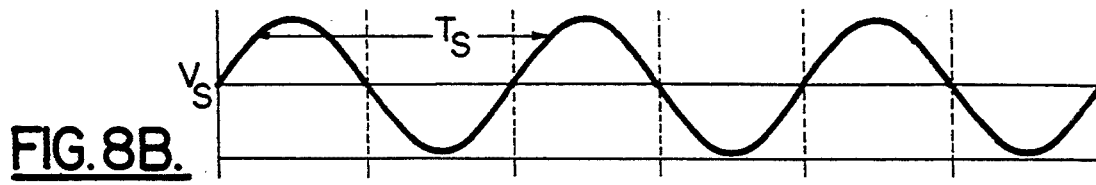
FIG. 8B.
FIG. 8C.
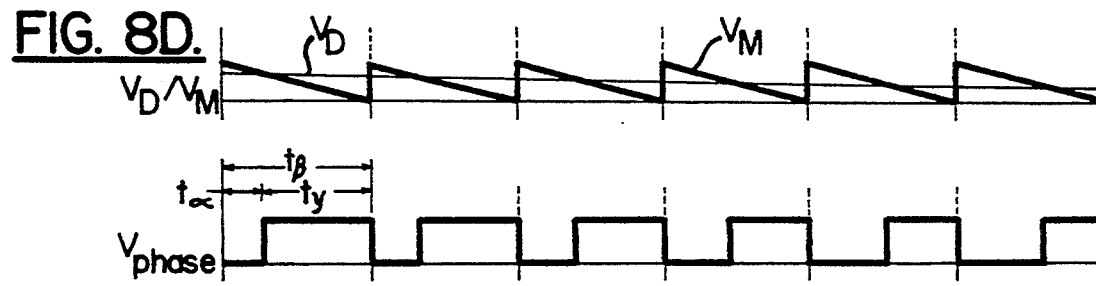
FIG. 8D.
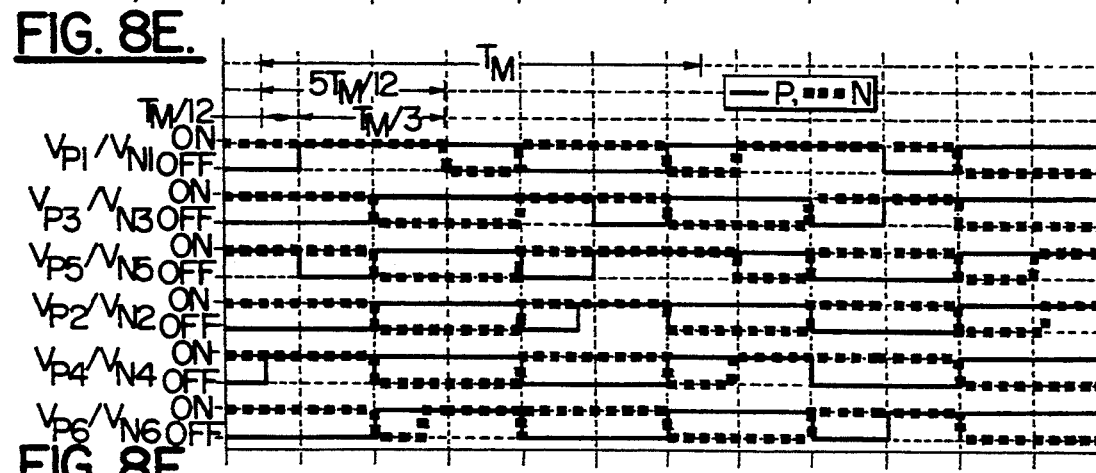
FIG. 8E.
FIG. 8F.

ADJUSTABLE SPEED DRIVE FOR RESIDENTIAL APPLICATIONS

FIELD OF THE INVENTION

This invention relates to an adjustable speed drive electric motor for use in residential applications.

BACKGROUND OF THE INVENTION

Residential appliances such as heat pumps, air conditioners and refrigerators have traditionally used single-speed induction motors to drive compressors and fans. Traditional appliances regulate temperature by cycling the motor and associated compressor or fan between full capacity and zero capacity. This strategy meets only the average heating or cooling requirement, is inefficient, and regulates temperature comparatively poorly. Replacing the single-speed induction motor with an electronic adjustable speed drive (ASD) and a permanent magnet motor (PMM) greatly improves appliance performance. ASD-PMM based appliances operate continuously and regulate temperature by instantaneously adjusting the speed of the motor and the associated compressor or fan to match the current heating or cooling requirement. Both efficiency and temperature regulation are improved.

Traditional DC motors include stationary magnets, rotatable armature windings, and a mechanical commutator. While traditional DC motors with adjustable speed drive are known in the prior art, these motors are unsuited for many residential applications because the mechanical commutator is not able to operate in the refrigerant of the compressor of a heat pump, air conditioner, or refrigerator. This limitation may be overcome by using an electronically commutated electric motor which can be placed in the refrigerant eliminating the need for a rotating seal.

An example of an adjustable speed drive permanent magnet motor is disclosed in the Erdman U.S. Pat. No. 4,556,827. The Erdman '827 patent discloses an adjustable speed drive electronically commutated motor wherein the motor speed is regulated by chopping the rectified commutator input current at a frequency which is high with respect to the frequency of the input current. This method of motor speed regulation will be referred to as high frequency pulse width modulation (PWM). This high frequency chopping technique is required where rapid changes in motor speed are required, such as in a washing machine.

Liabilities of the high frequency pulse width modulation speed control system disclosed by the Erdman '827 patent include high cost, utility line distortion, and electromagnetic interference. The high frequency pulses generated by the commutator circuit generate electromagnetic interference (EMI) which is both conducted back to the utility line power source and radiated to the outside environment. The distorted line current drawn from the utility by prior art ASDs distorts the utility voltage causing a potential for interference with other nearby loads. The radiated EMI causes the potential for interference with electronic devices including communications devices. As a result, the high-frequency pulse width modulation technique used to regulate motor speed requires substantial filtering to reduce electromagnetic interference to acceptable levels.

SUMMARY OF THE INVENTION

A first aspect of the invention is a method for controlling the operation of an electronically commutated motor having a rotor, a stator coil, and an electronic commutator for controlling electrical power flow from an electrical power source of predetermined frequency to the stator coil. The method comprising the steps of: generating a switch control signal responsive to a position of the rotor; generating a phase gating signal from the electrical power source, the phase gating signal having transitions in timed relation to the electrical power source; varying the timed relation of the phase gating signal in accordance with an operational parameter desired for the electronically commutated motor; generating a phase controlled switch signal responsive to both the switch control signal and the phase gating signal; and applying the switch control signal to the electronic commutator to control the electronic commutator, thereby controlling the electronically commutated motor. In the method, the phase gating signal may have a frequency integrally related to the predetermined frequency. Furthermore, the phase gating signal may have a frequency two times the predetermined frequency. The phase gating signal may also have transitions in timed relation to zero-crossings of the electrical power source.

A second aspect of the present invention is an adjustable speed drive for residential applications driven by an electrical power source of predetermined frequency. The adjustable speed drive comprises: an electronically commutated motor having a rotor, a stator coil, and an electronic commutator for controlling electrical power flow from the electrical power source to the stator coil; a commutator controller having a rotor position sensor operatively associated with the electronically commutated motor for generating a switch control signal responsive to a position of the rotor; a converter controller electrically connected to the electrical power source for generating a phase gating signal having a frequency corresponding to the predetermined frequency and having transitions in timed relation to the electrical power source wherein the timed relation is variable in accordance with an operational parameter desired for the electronically commutated motor; a circuit electrically connected to both the commutator controller and the converter controller for generating a phase controlled switch signal responsive to both the switch control signal and the phase gating signal; and wherein the circuit is electrically connected to the electronic commutator to apply the phase controlled switch signal to the electronic commutator and control the electronic commutator, thereby controlling the electronically commutated motor. In this aspect of the invention, the circuit may comprise an AND gate. The invention may further comprise a motor operation signal generator electrically connected to the converter controller for generating a motor operation signal in accordance with an operational parameter desired for the electronically commutated motor.

A third aspect of the invention is a refrigeration unit having an adjustable speed drive driven by an electrical power source of predetermined frequency. The refrigeration unit comprises: a fan; an electronically commutated motor drivingly connected to the fan, the motor having a rotor, a stator coil, and an electronic commutator for controlling electrical power flow from the electrical power source to the stator coil; a commutator controller having a rotor position sensor operatively associated with the electronically commutated motor for generating a switch control signal responsive to a position of the rotor; a converter controller electrically connected to the electrical power source for generating a phase gating signal having a frequency corresponding to the predetermined frequency and having transitions in timed relation to the electrical power source wherein the timed relation is variable in accordance with an operational parameter desired for the electronically commutated motor; a circuit electrically connected to both the commutator controller and the converter controller for generating a phase controlled switch signal responsive to both the switch control signal and the phase gating signal; and wherein the circuit is electrically connected to the electronic commutator to apply the phase controlled switch signal to the electronic commutator and control the electronic commutator, thereby controlling the electronically commutated motor. The circuit may comprise an AND gate. The refrigeration unit may further comprise a motor operation signal generator electrically connected to the converter controller for generating a motor operation signal in accordance with an operational parameter desired for the electronically commutated motor. The refrigeration unit may comprise a refrigerator; a heat pump; an air conditioner; any other refrigeration apparatus; or any other Heating, Ventilation, Air Conditioning ("HVAC") apparatus.

Yet another aspect of the present invention is a refrigeration unit having an adjustable speed drive driven by an electrical power source of predetermined frequency. This refrigeration unit may comprise: a compressor; an electronically commutated motor drivingly connected to the compressor, the motor having a rotor, a stator coil, and an electronic commutator for controlling electrical power flow from the electrical power source to the stator coil; a commutator controller having a rotor position sensor operatively associated with the electronically commutated motor for generating a switch control signal responsive to a position of the rotor; a converter controller electrically connected to the electrical power source for generating a phase gating signal having a frequency corresponding to the predetermined frequency and having transitions in timed relation to the electrical power source wherein the timed relation is variable in accordance with an operational parameter desired for the electronically commutated motor; a circuit electrically connected to both the commutator controller and the converter controller for generating a phase controlled switch signal responsive to both the switch control signal and the phase gating signal; and wherein the circuit is electrically connected to the electronic commutator to apply the phase controlled switch signal to the electronic commutator and control the electronic commutator, thereby controlling the electronically commutated motor. The circuit may comprise a logic gate such as an AND gate. The refrigeration unit may also comprise a motor operation signal generator electrically connected to the converter controller for generating a motor operation signal in accordance with an operational parameter desired for the electronically commutated motor. The refrigeration unit may comprise a refrigerator; a heat pump; an air conditioner; any other refrigeration apparatus; or any other Heating, Ventilation, Air Conditioning ("HVAC") apparatus.

The foregoing and other objects and aspects of the present invention are explained in detail in the Figures herein and the specification set forth below.

BRIEF DESCRIPTION OF THE DRAWINGS

FIGS. 2A-2F are signal timing diagrams illustrating the operation of the prior art adjustable speed drive of FIG. 1.

FIGS. 8A-8F are signal timing diagrams illustrating the operation of the adjustable speed drive of FIG. 6.

DETAILED DESCRIPTION OF PREFERRED EMBODIMENT

Figure 1:
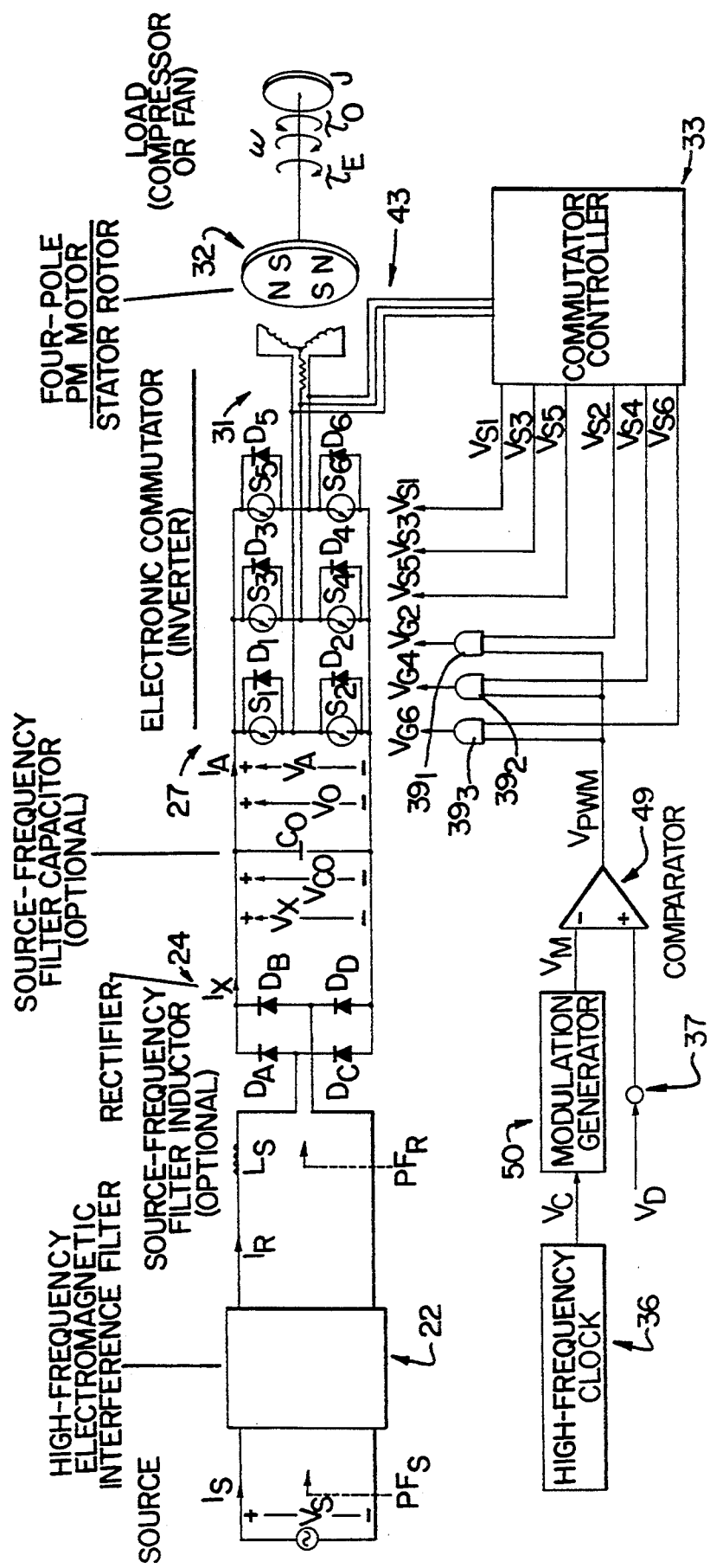
FIG. 1 is a schematic diagram of an adjustable speed drive representative of the existing state of the art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the dimensions and relative positions of the various elements are exaggerated for clarity. Like numbers refer to like elements throughout.

The device of FIG. 1 is representative of the prior art device shown in U.S. Pat. No. 4,566,827 to Erdman and includes a rectifier circuit 24, an electronic commutator 27, and an electric motor having stator coils 31 and a permanent magnet rotor 32. The electronic commutator 27 includes unidirectional conducting unidirectional blocking control switches $S_1$ to $S_6$. These switches switch power to the stator coils 31 in response to control signals generated by the combination of the converter controller having a comparator 49, a high frequency clock 36, and a modulation generator 50; the commutator controller 33; and "AND" gates $39_1$ to $39_3$. The converter controller generates a pulse width modulation (PWM) gating signal $V_{PWM}$ which is supplied to a first input of each "AND" gate $39_1$ to $39_3$. The frequency of this signal is determined by the clock signal $V_C$ generated by the high frequency clock 36 while the duty cycle is responsive to the motor operation signal $V_D$ which is applied to the motor operation input 37. The frequency of the clock signal $V_C$ is typically two or more orders of magnitude greater than the frequency of the electrical power signal $V_S$. This high frequency is required when rapid changes in motor speed are desired, such as in a washing machine. The commutator controller generates switch control signals $V_{S1}$ to $V_{S6}$ which are responsive to the position of the permanent magnet rotor 32. The switch control signals $V_{S2}$, $V_{S4}$, and $V_{S6}$ corresponding to control switches $S_2$, $S_4$, and $S_6$ are applied to respective second inputs of the AND gates $39_1$ to $39_3$. These signals are combined by the logical "AND Function" of the "AND" gates $39_{1-3}$ resulting in PWM switch control signals $V_{G2}$, $V_{G4}$, and $V_{G6}$. Accordingly, switches $S_2$, $S_4$, and $S_6$ are cycled on and off at the frequency of the high frequency clock signal $V_C$ over a time period related to the position of the rotor which is determined by the rotor position sensor 43 and the commutator controller 33. The remainder of the time, the switches remain off. The speed of the motor is increased by increasing the motor speed signal $V_D$ thereby increasing the duty cycle of the pulse width modulation signal $V_{PWM}$ thereby changing the duty cycle of the PWM switch control signals $V_{G2}$, $V_{G4}$, and $V_{G6}$ and accordingly the length of time each switch $S_2$, $S_4$, and $S_6$ stays on during a cycle. Switches $S_1$, $S_3$, and $S_5$ are controlled directly by switch control signals $V_{S1}$, $V_{S3}$, and $V_{S5}$ which are not pulse width modulated.

FIGS. 2A-2F are timing diagrams illustrating the relationships of the various control signals involved in the operation of the prior art adjustable speed drive of FIG. 1. The various vertical axes representing signal amplitude and the various horizontal axes representing time do not share a common dimension but are scaled to enhance the clarity of the description. In particular, the high frequency components of signals illustrated in FIGS. 2C, 2D, 2E and 2F are not on the same time scale as the relatively low frequency components of signals illustrated in FIGS. 2A, 2B and 2F.

Now referring to FIG. 2A, switch control signals $V_{S1}$ to $V_{S6}$ are generated by the commutator controller 33 in response to the rotor position. Each of the signals is either "ON" with a relatively high signal amplitude, or "OFF" with a relatively low signal amplitude. A "ON" switch control signal indicates that a respective unidirectional blocking unidirectional conducting control switch may conduct electrical power flow to the stator coils 31 thereby advancing the rotation of the rotor 32.

FIG. 2B illustrates the electrical power signal $V_S$ while FIG. 2C illustrates the high frequency clock signal $V_C$. The clock signal $V_C$ comprises a high frequency pulse which is independently generated by the high frequency clock 36, and has a frequency which is typically two or more orders of magnitude greater than the frequency of the electrical power signal $V_S$. This clock signal $V_C$ is applied to a modulation generator 50 thereby generating the modulation signal $V_M$.

In FIG. 2D, the modulation signal $V_M$ is shown superimposed on motor operation signal $V_D$. The motor operation signal $V_D$ and the modulation signal $V_M$ are both applied to respective inputs of the comparator 49. As shown in FIG. 2E, the comparator generates a pulse width modulation (PWM) gating signal $V_{PWM}$ which has a frequency equal to the frequency of the clock signal $V_C$. As long as the amplitude of the modulation signal $V_M$ exceeds the amplitude of the motor operation signal $V_D$ the PWM gating signal $V_{PWM}$ has a relatively high amplitude. When the motor speed signal exceeds the modulation signal, the PWM signal has a relatively low amplitude. Accordingly, the duty cycle of the PWM gating signal may be varied by varying the amplitude of the motor speed signal.

By combining the PWM gating signal $V_{PWM}$ with switch control signals $V_{S2}$, $V_{S4}$, and $V_{S6}$ through the use of "AND" gates $39_1$ to $39_3$ respective PWM switch control signals $V_{G2}$, $V_{G4}$ and $V_{G6}$ are thereby obtained. In FIG. 2F, PWM switch control signals $V_{G2}$, $V_{G4}$, and $V_6$ and switch control signals $V_{S1}$, $V_{S2}$, and $V_{S3}$ are illustrated. These signals are applied to control switches $S_1$ to $S_6$. This pulse width modulation speed control system varies the average power flow through the stator coils 31 by pulsing selected unidirectional control switches at a high frequency.

A problem with the device of FIG. 1 is that the high frequency pulse width modulation speed control system generates a great deal of electromagnetic interference (EMI). This EMI can interfere with other loads operating from the same power source necessitating the use of a large EMI filter 22, inductor $L_S$, and capacitor $C_O$. Radiated EMI can even interfere with the operation of electrically isolated electronic devices such as communications devices. In addition, the high switching speed results in unnecessary switching losses and stress on the unidirectional control switches $S_1$ to $S_6$. The high frequency pulse width modulation, however, is required in applications requiring rapidly changing motor speeds such as in a washing machine. In applications where relatively gradual changes in motor speed are acceptable, high frequency pulse width modulation is not necessary.

Figure 3:
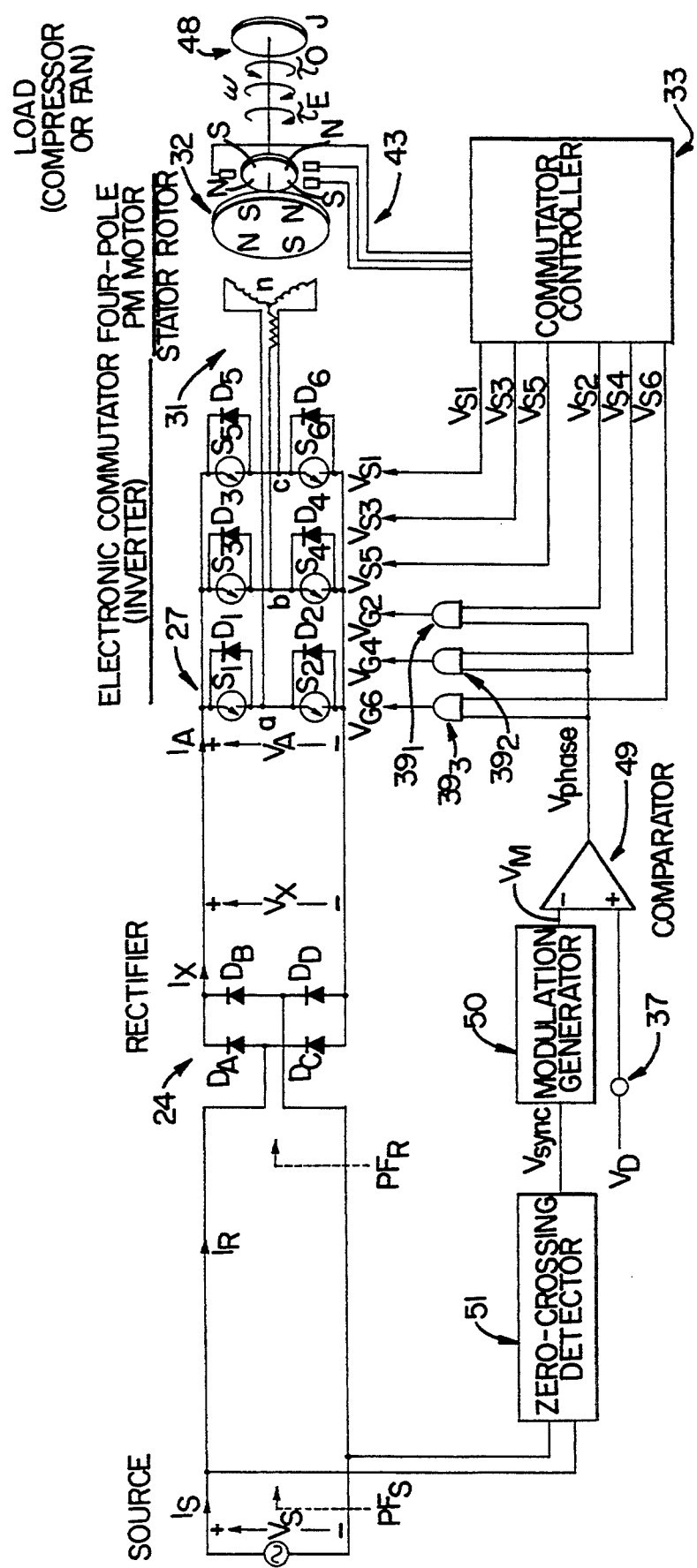
FIG. 3 is a schematic diagram of a first embodiment of the adjustable speed drive of the present invention including both rectifier and electronic commutator circuits.

Now referring to FIG. 3 there is shown a schematic diagram illustrating a first embodiment of the present invention. A rectifier circuit 24 comprising diodes $D_A$ to $D_D$ arranged in a diode bridge draws power from electrical power source 20 having electrical power signal $V_S$. The current drawn from the power source by the rectifier circuit is labeled $i_R$. The rectifier circuit 24 provides full wave rectified electrical power to the electronic commutator 27 comprising unidirectional blocking unidirectional conducting control switches $S_1$ to $S_6$ and associated commutator diodes $D_1$ to $D_6$. The unidirectional blocking unidirectional conducting control switches may comprise any of a number of electronic devices known to those having skill in the art including but not limited to a bipolar junction transistor (BJT), an insulated gate bipolar transistor (IGBT), a metal oxide silicon field effect transistor (MOSFET), a conventional thyristor or a gate turn off thyristor (GTO). The unidirectional blocking unidirectional conducting control switches $S_1$ to $S_6$ selectively switch power on and off to stator coils 31 in response to phase controlled switch signals $V_{G2}$, $V_{G4}$, and $V_{G6}$ and switch control signals $V_{S1}$, $V_{S3}$, and $V_{S5}$.

The electric motor comprises the stator coils 31 and a rotor 32 which preferably includes at least one permanent magnet. In a three phase bipolar motor for example, three stator coils are connected in a "Y" configuration, a first end of each coil being connected at a neutral point. The rotor 32 is rotatably mounted in relation to the stator coils 31 such that the rotor spins when power is applied through the electronic commutator 27 to the stator coils 31. A load 48 is drivingly connected to the rotor 32 by means of a drive shaft such that the load spins with the rotor. The load 48 may comprise any number of mechanical devices including but not limited to a compressor or a fan used in a refrigeration unit such as a refrigerator; air conditioner; heat pump; or any other Heating, Ventilation, Air Conditioning ("HVAC") apparatus. In these applications, rapid changes in the motor speed is not required.

The operation of unidirectional control switches $S_1$ to $S_6$ is determined by a control system including a commutator controller 33; "AND" gates $39_1$ to $39_3$; and a converter controller typically having a comparator 49, modulation generator 50, and zero-crossing detector 51. The commutator controller 33 determines the position of the rotor 32 through the rotor position sensor 43.

Figure 6:
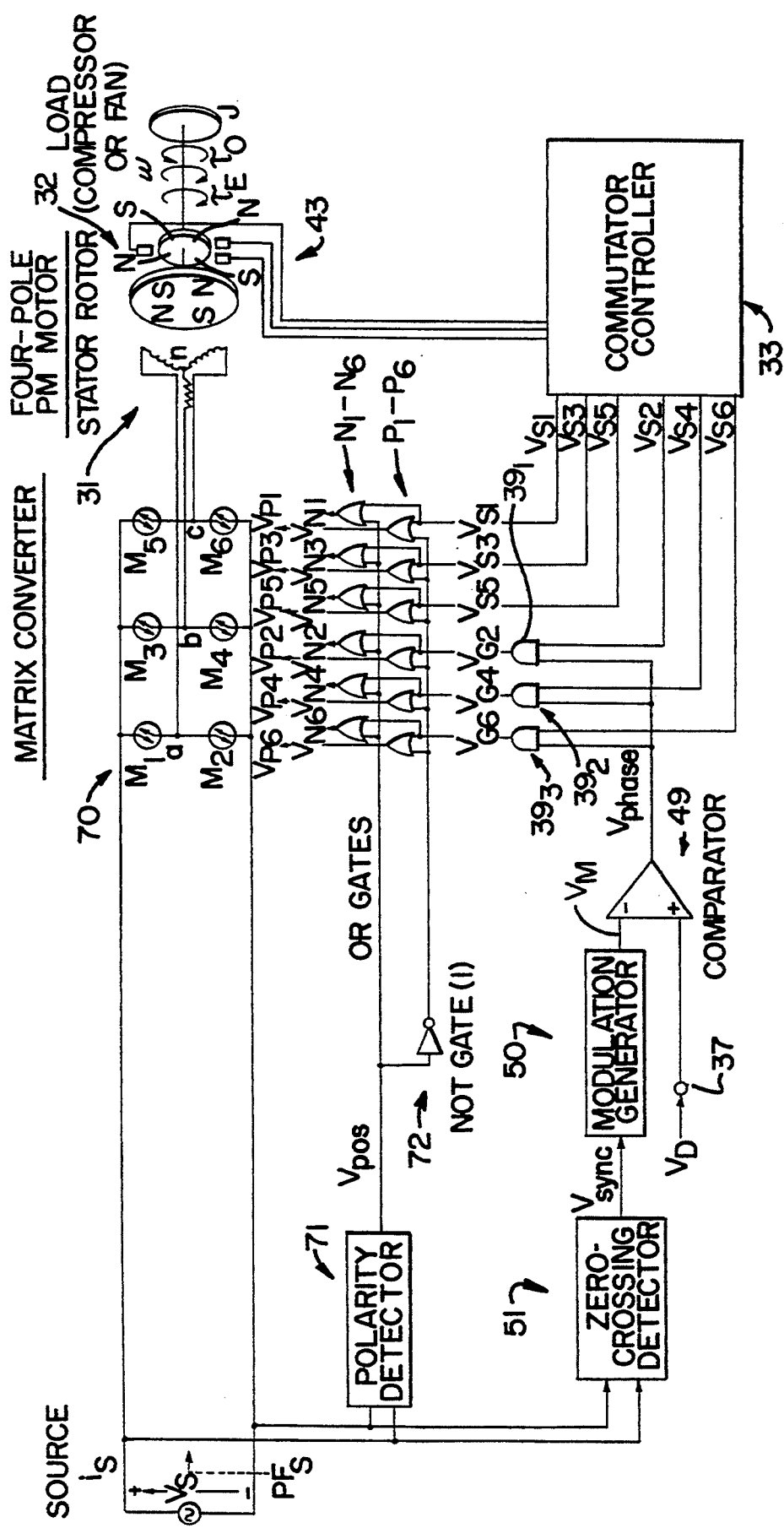
FIG. 6 is a schematic diagram of a second embodiment of the adjustable speed drive of the present invention including a matrix converter.

The switch control signals $V_{S1}$ to $V_{S6}$ are generated by the combination of the commutator controller 33 and rotor position sensor 43 as illustrated in FIGS. 3 and 6. As is known in the art, the rotor position sensor 43 may employ optical, magnetic, Hall-effect or other physical effects to generate a signal which may be used to indicate the position of the rotor 32. The position sensing circuitry may also provide positional information by detecting the back electromotive force ("EMF") signals derived from the stator coils. These signals are monitored at the end of each stator coil where that coil is electrically connected to a respective pair of switches. These signals, which are proportional to the angular velocity of the rotor, are subsequently integrated to provide the desired position signal. The commutator controller 33 generates switch control signals $V_{S1}$ to $V_{S6}$ in response to the rotor position. These signals are associated with unidirectional blocking unidirectional conducting control switches $S_1$ to $S_6$ and determine the time periods during which each control switch should either conduct or block power flow to the stator coils 31. In a three phase bipolar motor, a second end of each stator coil may be electrically connected to a respective pair of unidirectional blocking unidirectional conducting control switches. Switch control signals $V_{S1}$, $V_{S3}$, and $V_{S5}$ are applied directly to respective switches $S_1$, $S_3$, and $S_5$. Switch control signals $V_{S2}$, $V_{S4}$, and $V_{S6}$ are phase modulated with respect to the period $T_S$ of the electrical power signal $V_S$.

A zero-crossing detector 51 which is electrically connected to the electrical power source 20 determines when the amplitude of the electrical power signal $V_S$ crosses a common reference or zero level and generates a synchronization signal $V_{sync}$ with a frequency equal to twice the frequency of the power source. The synchronization signal $V_{sync}$ comprises an electrical pulse at times when the electrical power signal crosses the common reference or zero level. The synchronization signal $V_{sync}$ is applied to a modulation generator 50 which generates a modulation signal $V_M$ having a predetermined waveform and a frequency equal to that of $V_{sync}$. In a preferred embodiment, the modulation signal $V_M$ waveform comprises a saw tooth waveform with an initial rising edge followed by a linearly decreasing signal amplitude level. The modulation signal $V_M$ is in turn applied to the negative input of the comparator 49. The motor operation signal $V_D$ is applied through input 37 to the positive input of the comparator 49. The motor operation signal $V_D$ is a signal which is proportional to the average current through each switch $S_1$ to $S_6$. The motor operation signal $V_D$ may be supplied by any of a number of devices including but not limited to a potentiometer, a manually adjustable reohstat, a programmable chip, etc. The motor operation signal $V_D$ may be responsive to any of a number of operational parameters or inputs including but not limited to temperature, electronic commutator current $i_A$, motor speed $\omega$, motor output torque $\tau_O$, etc. In one embodiment, a motor operation signal generator having various inputs including but not limited to some or all of those mentioned above may generate a motor operation signal $V_D$ thereby controlling various aspects of the motor operation. These aspects of motor operation include but are not limited to motor speed $\omega$, motor torque $\tau_E$, electronic commutator current $i_A$, etc. In addition, the motor operation signal generator may include algorithms to maintain the current through switches $S_1$ to $S_6$ below specified levels.

The comparator 49 generates a phase gating signal $V_{phase}$ with a frequency equal to twice that of the electrical power signal $V_S$ and a phase determined by the relationship of the modulation signal $V_M$ and the motor operation signal $V_D$. Switch control signals $V_{S2}$, $V_{S4}$, and $V_{S6}$ are applied to respective first inputs of respective "AND" gates $39_1$, $39_2$, and $39_3$ while the phase gating signal $V_{phase}$ is applied to respective second inputs of each "AND" gate thereby generating respective phase controlled switch signals $V_{G2}$, $V_{G4}$, and $V_{G6}$. Phase controlled switch signals $V_{G2}$, $V_{G4}$, and $V_{G6}$ are respectively applied to unidirectional control switches $S_2$, $S_4$, and $S_6$. Accordingly, unidirectional blocking unidirectional conducting control switches $S_2$, $S_4$, and $S_6$ transmit power to the stator coils 31 in a series of phased pulses over intervals of time determined by the commutator controller 33.

FIGS. 4A–4F are waveform diagrams illustrating the relationships of the various electrical signals of the embodiment of the present invention illustrated in FIG. 3. The horizontal axis of each waveform represents a time base. The zero point of each horizontal axis represents a common starting time for the purpose of explanation. The vertical axis for each signal represents the amplitude of that signal and the scale of that axis is unique to each diagram.

Figure 4A:
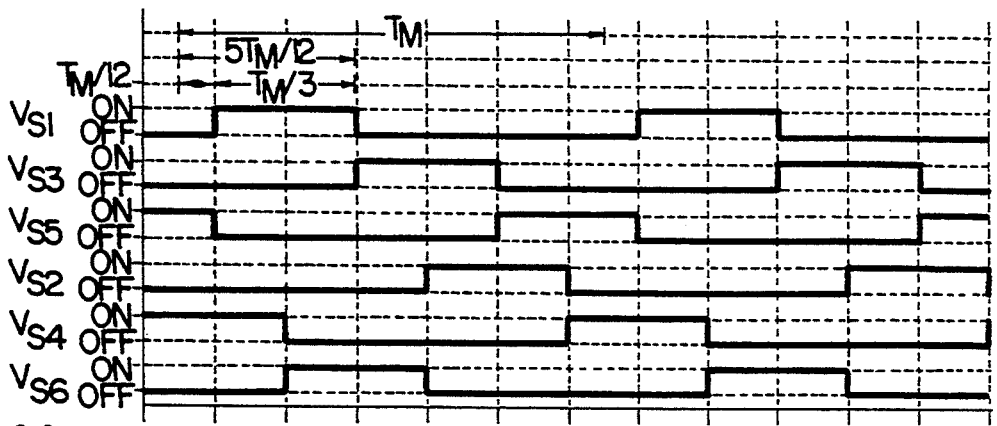
FIGS. 4A-4F are signal timing diagrams illustrating the operation of the adjustable speed drive of FIG. 3.

In FIG. 4A, switch control signals $V_{S1}$ to $V_{S6}$ are generated by the commutator controller 33 in response to the rotor position as indicated by the rotor position sensor. Each of these signals corresponds to a unidirectional control switch $S_1$ to $S_6$ as illustrated in FIG. 3. The switch drive signals are either "ON" with a relatively high signal amplitude or "OFF" with a relatively low signal amplitude. The switch control signal period $T_M$ is equal to the time required for the rotor 32 to complete one revolution divided by the number of magnetic pole pairs included on the rotor. Accordingly, this period of time is variable depending of the speed of the rotor 32. The "ON" time period $t_{\overline{L}}$ is the period of time when a respective switch control signal is "ON" and this period is equal to $(T_M)/3$. The "ON" time period $t_{\overline{L}}$ for each switch control signal corresponds to the time that the rotor 32 is in a position such that electrical power flow through the respective unidirectional control switch would further advance the rotation of the rotor 32.

Figure 4B:
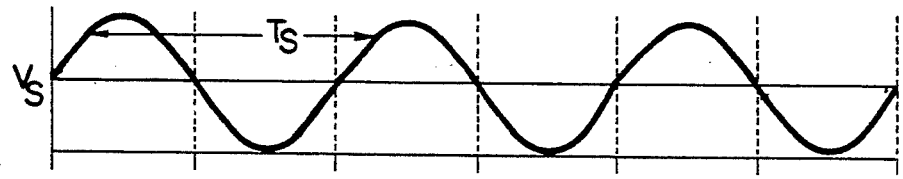
Figure 4C:

The electrical power signal $V_S$, illustrated in FIG. 4B, is typically a sinusoidal signal with a constant 60 Hz frequency and either 220 V rms or 110 V rms in the United States. Different areas, however, may supply electrical power signals having other characteristics such as 50 Hz, etc. The period of the signal $T_S$ is 16.7 ms corresponding to a 60 Hz frequency, and the signal is typically supplied by a utility by means well known in the art. Such means may comprise a utility line, a portable generator, a local "emergency" generator, etc. The synchronization signal $V_{sync}$ is generated by the zero-crossing detector 51 in response to the electrical power signal $V_S$. As illustrated in FIG. 4C, the synchronization $V_{sync}$ signal comprises a pulse having a rising edge corresponding to each zero-crossing of the electrical power signal $V_S$.

Figure 4D:

The motor operation signal $V_D$ and the modulation signal $V_M$ are superimposed in FIG. 4D to illustrate their relationship to one another and to the phase gating signal $V_{phase}$. The modulation signal $V_M$ is a repetitive waveform with a frequency equal to that of the synchronization signal $V_{sync}$ and a minimum amplitude having a fixed relation in time to the synchronization signal $V_{sync}$. The modulation signal comprises a sawtooth waveform in this illustration, but any number of other waveforms such as a triangle wave or sine wave may be chosen. The motor operation signal $V_D$ is a signal which may be varied depending on the desired motor operation.

Figure 4E:
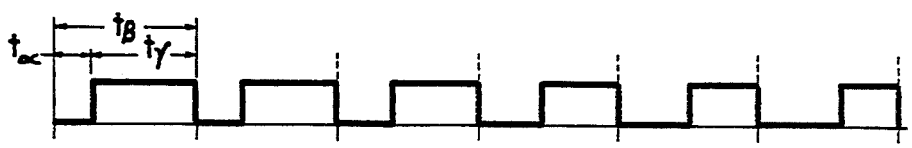

In FIG. 4E, the phase gating signal $V_{phase}$ is generated by the comparator 49 having the motor operation signal $V_D$ and the modulation signal $V_M$ as inputs. As long as the motor operation signal $V_D$ amplitude is greater than the modulation signal $V_M$ amplitude the phase gating signal $V_{phase}$ maintains a relatively low amplitude. When the motor operation signal $V_D$ amplitude is less than the modulation signal $V_M$ amplitude, the phase gating signal $V_{phase}$ maintains a relatively high amplitude. The time period from the rise of the synchronization signal to the rise of the phase gating signal is labeled $t_\alpha$. The time from the rise of the synchronization signal to the fall of the phase gating signal is labeled $t_\beta$. The period of time equal to $t_\beta$ minus $t_\alpha$ is labeled $t_\gamma$. The relationships between $t_\beta$, $t_\alpha$, and $t_\gamma$ are determined by the waveform chosen for the modulation signal $V_M$ and the amplitude of the motor operation signal $V_D$. The phase gating signal $V_{phase}$ of this embodiment has a transition from a relatively low amplitude to a relatively high amplitude corresponding to every pulse of the synchronization signal $V_{sync}$. The time delay $t_\alpha$ between a synchronization signal pulse and the corresponding transition of the phase gating signal is a variable determined by the motor operation signal $V_D$. Accordingly, there is a variable timed relation between the zero-crossing of the electrical power source and the phase gating signal.

Figure 4F:
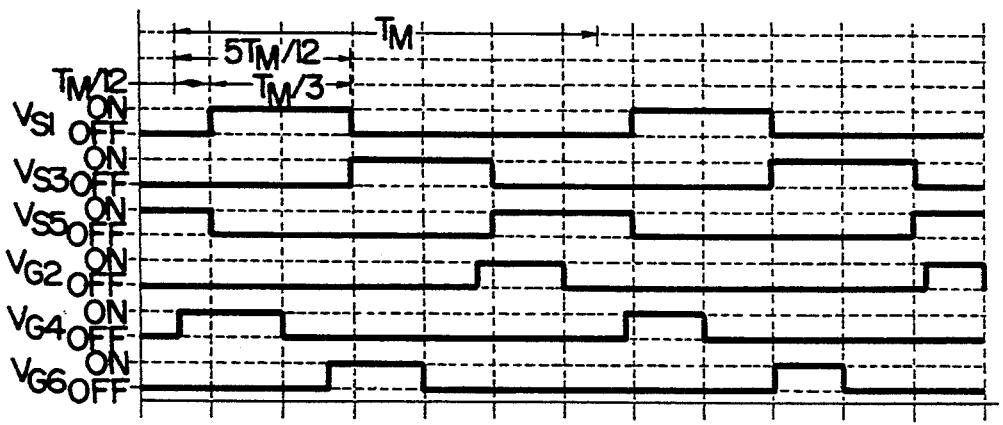

FIG. 4F illustrates the signals that are applied to the unidirectional blocking unidirectional conducting control switches. Switch drive signals $V_{S1}$, $V_{S3}$, and $V_{S5}$ are applied directly to respective unidirectional blocking unidirectional conducting control switches $S_1$, $S_3$, and $S_5$. For this reason, these signals are merely copied from FIG. 4A. Switch drive signals $V_{S2}$, $V_{S4}$, and $V_{S6}$, however, are combined with the phase gating signal $V_{phase}$ through the operation of "AND" gates $39_1$ to $39_3$ to produce phase controlled switch signals $V_{G2}$, $V_{G4}$, and $V_{G6}$ which are then applied to unidirectional conducting unidirectional blocking control switches $S_2$, $S_4$, and $S_6$.

Figure 5:
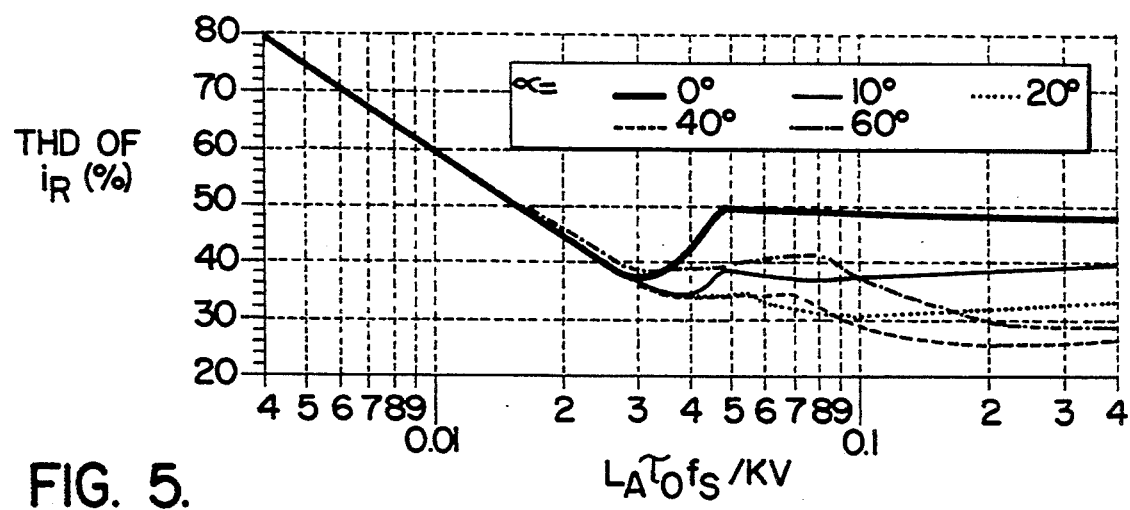
FIG. 5 is a graph illustrating the expected total harmonic distortion of the current drawn by the rectifying circuit of the adjustable speed drive of FIG. 3.

A theoretically ideal adjustable speed drive electric motor (ASD) draws a sinusoidal rectifier current $i_R$. Total Harmonic Distortion (THD) of $i_R$ is one measure of how closely an ASD approaches this ideal. FIG. 5 shows the predicted THD of $i_R$ for the first embodiment of the present invention which is illustrated in FIG. 3. In a three phase bipolar motor, for example, the THD is a function of a dimensionless parameter $L_A \tau_O f_S / KV$ where $L_A$ (H) is the inductance of two motor stator coils connected in series, $\tau_O$ (N-m) is the output torque, $f_S$ (Hz) is the electrical power signal frequency, K (N-m/A) is the motor constant, and V (V) is the rms electrical power source voltage. The THD is also a function of firing angle (or phase angle) $\alpha = (t_\alpha/T_S)360°$, where $t_\alpha$ is the period of time between the time that the electrical power source crosses the zero reference and the phase gating signal switches on (i.e. transitions from a low amplitude to a high amplitude), and $T_S$ is the period of the electrical power source. Note that THD is at a minimum for values of $L_A \tau_O f_S / KV > 0.026$. While not possible for all adjustable speed drives or for all operating conditions, the adjustable speed drive (ASD) of the present invention often operates with minimum THD in the full-load condition thereby minimizing interference with the electrical power signal $V_S$ when the power requirements are the greatest. While THD increases as the load is reduced, the effect of the THD is reduced because the rectifier current $i_R$ decreases with reduced loads. By manipulating the variables, a motor may be optimized for minimum THD in particular applications.

A second embodiment of the present invention is illustrated in FIG. 6 as a schematic diagram. This second embodiment, like the first embodiment of FIG. 3, uses a phase gating signal $V_{phase}$ to control the power flow transmitted to the stator coils 31. In this embodiment, however, a matrix converter 70 is used in place of the electronic commutator thereby eliminating the rectifier circuit. The matrix converter 70 comprises bi-directional conducting bi-directional blocking control switches $M_1$ to $M_6$. These switches $M_1$ to $M_6$ conduct and block current in two directions in response to respective positive gate signals $V_{P1}$ to $V_{P6}$ and negative gate signals $V_{N1}$ to $V_{N6}$ thereby defining a matrix converter.

Like the first embodiment of FIG. 3, this second embodiment includes a rotor position sensor 43 and a commutator controller 33 which are used to generate switch control signals $V_{S1}$ to $V_{S6}$ in response to the position of the rotor 32. This embodiment also includes a zero crossing detector 51, a modulation generator 50, and a comparator 49 which generate a phase gating signal $V_{phase}$. The phase gate signal has a frequency equal to twice that of the power source signal $V_S$, and transitions from a low amplitude to a high amplitude occurring in timed relation to the zero crossing of the power source signal. This timed relation is responsive to a motor operation signal $V_D$.

The motor operation signal $V_D$ is generated in the same manner as in the first embodiment of FIG. 3. The motor operation signal $V_D$ may be supplied by any of a number of devices including but not limited to a potentiometer, a manually adjustable reohstat, a programmable chip, etc. The motor operation signal $V_D$ may be responsive to any of a number of factors or inputs including but not limited to temperature, electronic commutator current $i_A$, motor speed $\omega$, motor output torque $\tau_O$, etc. In one embodiment, a motor operation signal generator having various inputs including but not limited to some or all of those mentioned above may supply motor operation signal $V_D$ thereby controlling various aspects of the motor operation. These controlled aspects of motor operation include but are not limited to motor speed $\omega$, motor torque $\tau_E$, electronic commutator current $i_A$, etc. In addition, the motor operation signal generator may include algorithms to maintain the current through switches $S_1$ to $S_6$ below specified levels.

This embodiment also includes "AND" gates $39_1$ to $39_3$ which combine the phase gating signal $V_{phase}$ with switch control signals $V_{S2}$, $V_{S4}$, and $V_{S6}$ thereby generating phase controlled switch signals $V_{G2}$, $V_{G4}$, and $V_{G6}$. The control circuitry of this embodiment differs from that of the embodiment in FIG. 3 with the inclusion of polarity detector 71, "NOT" gate 72, and "OR" gates $P_1$ to $P_6$ and $N_1$ to $N_6$. The polarity detector 71 is electrically connected to the electrical power source 20 and generates a polarity signal $V_{pos}$ in response to the polarity of the electrical power signal $V_S$. The polarity signal $V_{pos}$ maintains a relatively high amplitude when the electrical power signal $V_S$ is positive and maintains a relatively low amplitude when the electrical power signal $V_S$ is negative. The polarity signal $V_{pos}$ is applied directly to a respective input of each negative "OR" gate $N_1$ to $N_6$. The polarity signal $V_{pos}$ is also applied to "NOT" gate 72 which inverts the signal and applies it to a respective input of each positive "OR" gate $P_1$ to $P_6$. Switch control signals $V_{S1}$, $V_{S3}$, and $V_{S5}$ and phase controlled switch signals $V_{G2}$, $V_{G4}$, and $V_{G6}$ are each applied to a second respective input on both a respective positive "OR" gate $P_1$ to $P_6$ and a respective negative "OR" gate $N_1$ to $N_6$. Accordingly, each positive "OR" gate $P_1$ to $P_6$ generates a respective positive gate signal $V_{P1}$ to $V_{P6}$ corresponding to a respective bi-directional conducting bi-directional blocking control switches $M_1$ to $M_6$. Similarly, each negative "OR" gate $N_1$ to $N_6$ generates a respective negative gate signal $V_{N1}$ to $V_{N6}$ corresponding to a respective bi-directional blocking bi-directional conducting control switches $M_1$ to $M_6$.

The embodiment of FIG. 6 has the advantage of eliminating the rectifying circuit. Furthermore, this embodiment has the same electrical characteristics as the first embodiment illustrated in FIG. 3. Accordingly, the total harmonic distortion curve illustrated in FIG. 5 is equally applicable to this embodiment.

Figures 7A, 7B, 7C:
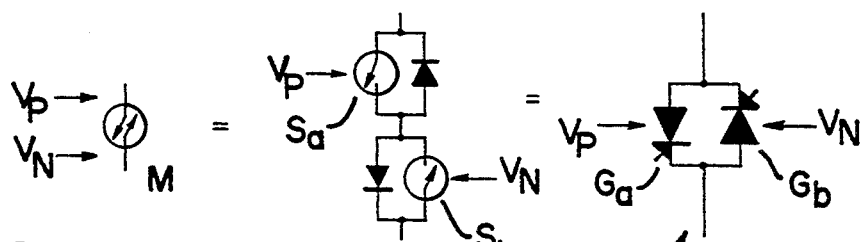
FIGS. 7A-7C is a schematic diagram of a circuit providing a bidirectional-blocking bidirectional-conducting switch function.

FIGS. 7A–7C illustrate embodiments of a bi-directional blocking bi-directional conducting control switch M. In FIG. 7A, the bi-directional blocking bi-directional conducting control switch M receives a positive gate signal $V_P$ for allowing the conduction of electrical power flow in a first direction, and a negative gate signal $V_N$ for allowing conduction of electrical power flow in a second direction. Such a circuit may comprise a circuit including two unidirectional blocking unidirectional conducting control switches and two diodes as illustrated by circuit 80 in FIG. 7B. A positive gate signal $V_P$ allows unidirectional blocking unidirectional conducting control switch $S_a$ to conduct power flow in one direction while negative gate signal $V_N$ allows a second unidirectional blocking unidirectional conducting control switch $S_b$ to conduct electrical power flow in a second direction. The unidirectional blocking unidirectional conducting control switch may comprise any number of devices including but not limited to a bipolar junction transistor (BJT), a metal oxide silicon field effect transistor (MOSFET), an insulated gate bipolar transistor (IGBT), a gated turn off thyristor (GTO), etc. FIG. 7C illustrates a second equivalent circuit 90 comprising two gate turn off thyristors $G_a$ and $G_b$. In this embodiment, no diodes are required.

FIGS. 8A–8F are waveform diagrams illustrating the relationship of the various electrical signals of the embodiment of the present invention illustrated in FIG. 6. The horizontal axis represents a time base. The zero point of each horizontal axis represents a common starting time for the purpose of explanation. The vertical axis for each signal represents the amplitude of the associated signal and the scale of that axis is unique for each signal.

In FIG. 8A, switch control signals $V_{S1}$ to $V_{S6}$ are generated by the commutator controller 33 in response to the rotor position. Each of these signals corresponds to a bidirectional blocking bidirectional conducting control switch $M_1$ to $M_6$ as illustrated in FIG. 6. The switch drive signals are either "ON" with a relatively high signal amplitude or "OFF" with a relatively low signal amplitude. The switch control signal period $T_M$ is equal to the time required for the rotor 32 to complete one revolution divided by the number of magnetic pole pairs included on the rotor. Accordingly, this period is variable depending on the speed of the rotor 32. These signals correspond directly to the switch control signals of FIGS. 3 and 4.

In FIG. 8B, the electrical power signal $V_S$ is typically a sinusoidal signal with a constant 60 Hz frequency and either a 220 V rms or 110 V rms in the United States. Accordingly, the electrical power signal $V_S$ has a period $T_S$ of approximately 16.7 ms.

The phase gating signal $V_{phase}$ in FIG. 8E corresponds to the phase gating signal of FIGS. 3 and 4, and it is generated in the same manner. The zero crossing detector 51 generates a synchronization signal $V_{sync}$, illustrated in FIG. 8C, comprising a pulse having a rising edge at points in time corresponding to the zero crossing of the electrical power signal $V_S$. The synchronization signal is applied to the modulation generator 50 which generates a modulation signal $V_M$, illustrated in FIG. 8D, comprising a repetitive waveform having a frequency equal to that of the synchronization signal and a starting point corresponding to the zero crossing of the electrical power signal $V_S$. The synchronization signal $V_{sync}$ waveform and the polarity signal $V_{pos}$ waveform are superimposed in FIG. 8C to emphasize their relationship to the electrical power signal $V_S$. The synchronization voltage $V_{sync}$ comprises the pulse illustrated by solid vertical lines, while the polarity signal $V_{pos}$ is illustrated by the dotted line. The polarity signal $V_{pos}$ is generated by the polarity detector 71 and comprises a signal having a relatively high amplitude at times when the electrical power signal $V_S$ has a positive amplitude and a relatively low amplitude corresponding to times when the electrical power signal $V_S$ has a negative amplitude.

In FIG. 8E, the phase gating signal $V_{phase}$ is generated and this signal is applied to "AND" gates $39_1$ to $39_3$ as discussed with regard to FIGS. 3 and 4. The phase gating signal $V_{phase}$ has a transition from a relatively low amplitude to a relatively high amplitude following every zero-crossing of the electrical power source. The delay $t_\alpha$ between the zero-crossing of the electrical power signal and the following transition of the phase gating signal is a variable dependent on the motor operation signal $V_D$.

In FIG. 6, however, the polarity signal $V_{pos}$ is applied directly to negative "OR" gates $N_1$ to $N_6$, and the polarity signal is inverted by "NOT" gate 72 and applied to positive "OR" gates $P_1$ to $P_6$. Switch control signals $V_{S1}$, $V_{S3}$, and $V_{S5}$ and phase controlled switch signals $V_{G2}$, $V_{G4}$, and $V_{G6}$ are each applied to a respective positive "OR" gate $P_1$ to $P_6$ and a respective negative "OR" gate $N_1$ to $N_6$. The resulting positive gate signals $V_{P1}$ to $V_{P6}$ are illustrated in FIG. 8F with solid lines. The resulting negative gate signals $V_{N1}$ to $V_{N6}$ are superimposed as dashed lines on the positive gate signals. Accordingly, a respective bi-directional blocking bi-directional conditioning control switch $M_1$ to $M_6$ allows electrical power flow in a positive direction at times corresponding to a relatively high amplitude of a respective positive gate signal $V_{P1}$ to $V_{P6}$. A respective bidirectional blocking bi-directional conducting control switch $M_1$ to $M_6$ allows electrical power flow in a second negative direction at times when the respective negative control signal $V_{N1}$ to $V_{N6}$ has a relatively high amplitude.

Figure 9:
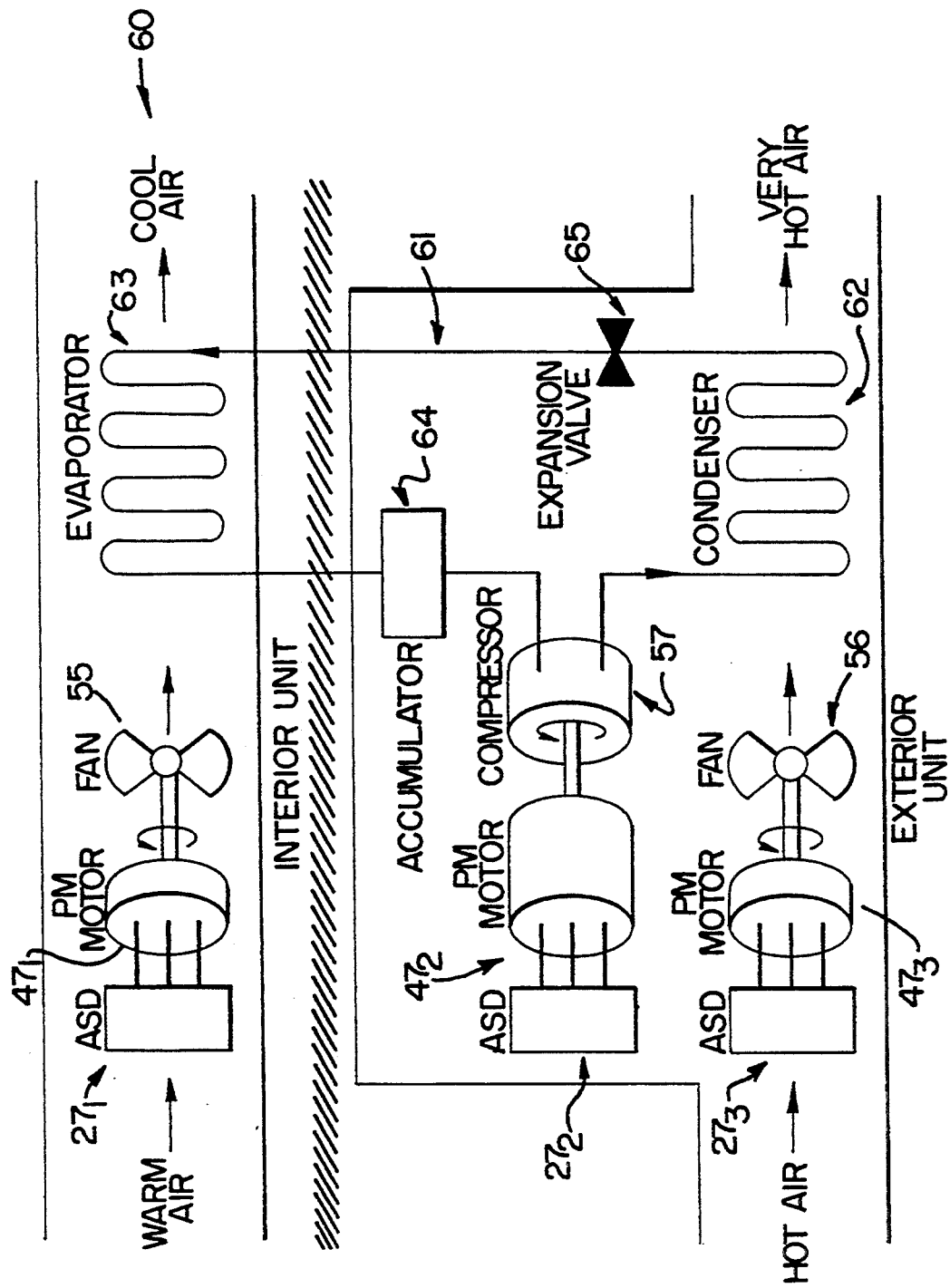
FIG. 9 is an illustration of a refrigeration device including an adjustable speed drive of the present invention.

Another aspect of this invention is a refrigeration unit 60 including an adjustable speed drive electric motor wherein the operation of the motor is varied through the use of a phase gating signal $V_{phase}$ having a frequency equal to twice the frequency of the electrical power signal $V_S$ and transitions from a low amplitude to a high amplitude occurring in timed relation to zero-crossings of the electrical power signal. FIG. 9 is an illustration of a typical refrigeration unit 60. In practice, the refrigeration unit may comprise but is not limited to an air conditioner; a heat pump; a refrigerator; any other refrigeration apparatus; or any other Heating, Ventilation, or Air Conditioning ("HVAC") apparatus. These applications do not require rapid changes in motor speed. The adjustable speed drive electric motor may be used to drive one or more fans or compressors or a combination of fans and compressors. In FIG. 9, the refrigeration unit comprises a first fan 55, a second fan 56, and a compressor 57. In each case, the fan or compressor is drivingly connected through a drive shaft to a respective motor $47_1$ to $47_3$ comprising stator coils 31 and a rotor 32 as illustrated for example in FIGS. 3 and 6. The unit may also comprise among other elements known to those having skill in the art a closed loop 61 for circulating a refrigerant, a condenser 62, an evaporator 63, an accumulator 64, and an expansion valve 65. The electronic commutators $27_1$ to $27_3$ and the associated control circuits may be electrically connected to respective motors $47_1$ to $47_3$ but located separately. Accordingly, the compressor 57 and the associated motor $47_2$ may be located within the closed loop 61 containing refrigerant without the need for a rotating seal.

Figure 10A:
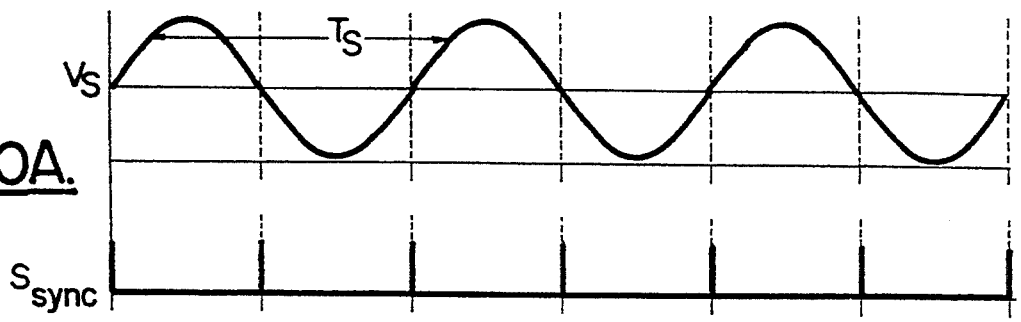
FIG. 10A is a signal timing diagram for the electrical power signal and synchronization voltage.
Figure 10B:
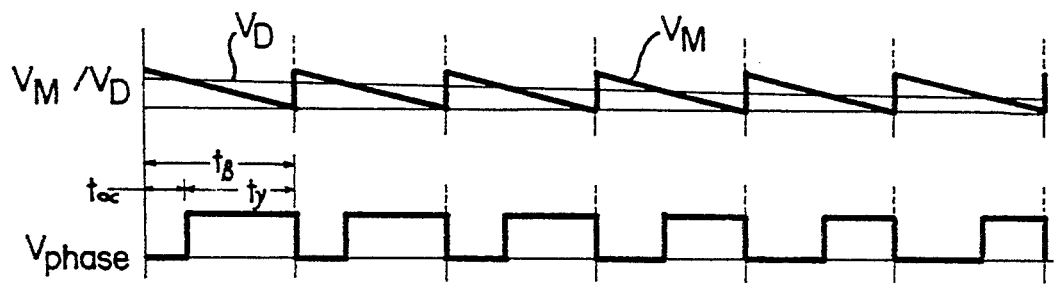
FIG. 10B is a signal timing diagram for a control strategy having a modulation signal with a ramp gating waveform.
Figure 10C:
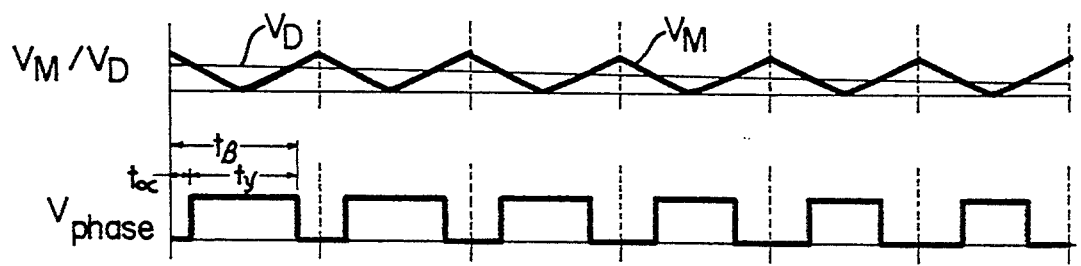
FIG. 10C is a signal timing diagram for a control strategy having a modulation signal with a triangle gating waveform.

FIGS. 10A-10C illustrate two alternate control strategies in relation to an electrical power signal $V_S$ and the corresponding synchronization signal $V_{sync}$. The horizontal axis represents a time base, and the vertical axis represents a signal amplitude.

FIG. 10B illustrates a modulation signal $V_M$ having a saw tooth waveform or ramp gating. As discussed with regard to FIG. 4, the motor operation signal $V_D$ comprises a signal with an amplitude in proportion to the desired motor speed. The phase gating signal has a relatively high amplitude when the modulation signal $V_M$ amplitude is less than the motor speed signal amplitude. The time which passes between a pulse on the synchronization signal and the low to high transition on the phase gating signal is defined as $t_\alpha$. The time which elapses between a pulse on the synchronization signal and the high to low transition on the phase gating signal is defined as $t_\beta$. With this ramp gating control scheme, $t_\alpha$ is a variable dependent on the motor operation signal, while $t_\beta$ is constant. In this example, $t_6$ is equal to $T_S/2$.

The modulation signal $V_M$ of FIG. 10B is the same as that illustrated in FIGS. 4 and 8. As discussed above, this waveform allows control of the time $t_\alpha$ between a pulse of the synchronization signal and the rising edge of the phase gating signal $V_{phase}$. By controlling the rising transition of the phase gating signal, the phase controlled switch signals $V_G$ are pulsed in timed relation to the electrical power signal. Accordingly, the current $i_R$ drawn by the adjustable speed drive electronically commutated motor is controlled in timed relation to the electrical power signal $V_S$. Accordingly, since the current drawn by the device is phased with respect to the electrical power source, there is an ability to control the shape of the current $i_R$ waveform thereby controlling the total harmonic distortion and the power factor of the device.

FIG. 10C illustrates a triangle gating scheme. As shown, both $t_\alpha$ and $t_\beta$ are variable with respect to the motor operation signal $V_D$. As the motor operation signal $V_D$ is increased, $t_\alpha$ decreases while $t_\beta$ increases. If the motor operation signal $V_D$ is decreased, $t_\alpha$ increases while $t_\beta$ decreases. Accordingly, the control switches may be turned "ON" and "OFF" with precision relative to the electrical power signal. Precise control of the power drawn by the electric motor may thereby be obtained.

The modulation signal $V_M$ of FIG. 10C provides control of both the rising and falling transitions of the phased gating signal $V_{phase}$ with respect to the synchronization signal and the electrical power signal. This allows the current $i_R$ drawn by the device to have a peak value at a time corresponding to the time that the voltage of the electrical power signal $V_S$ is at a peak. Accordingly, both the shape of the current $i_R$ waveform and its relationship in time with the electrical power signal may be controlled. Accordingly, the total harmonic distortion and the power factor of the device may be further reduced in comparison to the control strategy of FIG. 10B.

Other control strategies involving modulation signals with waveforms other than a triangle or saw tooth waveform will also provide advantages. Other waveforms might include a reverse saw tooth wave, a sine wave, an inverted triangle, an inverted sine wave, etc. The only limitation on the waveform chosen for the modulation signal is that it have a period equal to one half of the period $T_S$ of the electrical power signal $V_S$. Other benefits might include having a current which leads or lags the electrical power signal by a predetermined time period, having a rotor speed or torque that is directly proportional to the motor operation signal, etc.

An understanding of a prior art adjustable speed drive system incorporating the high frequency pulse width modulation (PWM) technique of the Erdman '827 patent is helpful in order to broaden the disclosure of the present invention. As will be understood by those having skill in the art, various aspects of the Erdman '827 patent may be incorporated in the present invention. Accordingly, the Erdman U.S. Pat. No. 4,566,827 is incorporated herein by reference.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for controlling the operation of an electronically commutated motor having a rotor, a stator coil, and an electronic commutator which controls electrical power flow from an electrical power source of predetermined frequency to said stator coil, said method comprising the steps of:
   generating a switch control signal responsive to a position of said rotor;
   generating a phase gating signal from said electrical power source, said phase gating signal comprising a transition from a first state to a second state at a predetermined time after a zero-crossing of said electrical power source;
   varying said predetermined time after said zero-crossing in accordance with an operational parameter desired for said electronically commutated motor;
   combining said switch control signal and said phase gating signal to produce a phase controlled switch signal; and
   applying said phase controlled switch signal, which is produced by combining said switch control signal and said phase gating signal, to said electronic commutator to control said electronic commutator, thereby controlling said electronically commutated motor.

2. A method according to claim 1, wherein said phase gating signal has a frequency which is an integral multiple of said predetermined frequency.

3. A method for controlling the operation of an electronically commutated motor having a rotor, a stator coil, and an electronic commutator which controls electrical power flow from an electrical power source of predetermined frequency to said stator coil, said method comprising the steps of:
   generating a switch control signal responsive to a position of said rotor;
   generating a phase gating signal from said electrical power source, said phase gating signal comprising a transition from a first state to a second state at a predetermined time after a zero-crossing of said electrical power source;
   varying said predetermined time after said zero-crossing in accordance with an operational parameter desired for said electronically commutated motor;
   generating a phase controlled switch signal responsive to both said switch control signal and said phase gating signal; and
   applying said phase controlled switch signal to said electronic commutator to control said electronic commutator, thereby controlling said electronically commutated motor;
   wherein said phase gating signal has a frequency two times said predetermined frequency.

4. An adjustable speed drive driven by an electrical power source of predetermined frequency, said adjustable speed drive comprising:
   an electronically commutated motor having a rotor, a stator coil, and an electronic commutator which controls electrical power flow from said electrical power source to said stator coil;
   a commutator controller having a rotor position sensor operatively associated with said electronically commutated motor, said commutator controller generating a switch control signal responsive to a position of said rotor;
   a converter controller electrically connected to said electrical power source, said converter controller generating a phase gating signal having a frequency corresponding to said predetermined frequency and comprising a transition from a first state to a second state at a predetermined time after a zero-crossing of said electrical power source wherein said predetermined time after said zero-crossing is variable in accordance with an operational parameter desired for said electronically commutated motor;
   a circuit electrically connected to both said commutator controller and said converter controller, said circuit combining said switch control signal and said phase gating signal to produce a phase controlled switch signal, and
   wherein said circuit is electrically connected to said electronic commutator to apply said phase controlled switch signal, which is produced by combining said switch control signal and said phase gating signal, to said electronic commutator and control said electronic commutator, thereby controlling said electronically commutated motor.

5. An adjustable speed drive according to claim 4, wherein said circuit is an AND gate.

6. An adjustable speed drive according to claim 4, said drive further comprising a motor operation signal generator electrically connected to said converter controller, said motor operation signal generator generating a motor operation signal in accordance with an operational parameter desired for said electronically commutated motor.

7. A refrigeration unit having an adjustable speed drive driven by an electrical power source of predetermined frequency, said refrigeration unit comprising:
   a fan;
   an electronically commutated motor drivingly connected to said fan, said motor having a rotor, a stator coil, and an electronic commutator which controls electrical power flow from said electrical power source to said stator coil;
   a commutator controller having a rotor position sensor operatively associated with said electronically commutated motor said commutator controller generating a switch control signal responsive to a position of said rotor;
   a converter controller electrically connected to said electrical power source, said converter controller generating a phase gating signal having a frequency corresponding to said predetermined frequency and comprising a transition from a first state to a second state at a predetermined time after a zero-crossing of said electrical power source wherein said predetermined time after said zero-crossing is variable in accordance with an operational parameter desired for said electronically commutated motor;
   a circuit electrically connected to both said commutator controller and said converter controller, said circuit combining said switch control signal and said phase gating signal to produce a phase controlled switch signal, and
   wherein said circuit is electrically connected to said electronic commutator to apply said phase controlled switch signal, which is produced by combining said switch control signal and said phase gating signal, to said electronic commutator and control said electronic commutator, thereby controlling said electronically commutated motor.

8. A refrigeration unit according to claim 7, wherein said circuit is an AND gate.

9. A refrigeration unit according to claim 7, said unit further comprising a motor operation signal generator electrically connected to said converter controller, said motor operation signal generator generating a motor operation signal in accordance with an operational parameter desired for said electronically commutated motor.

10. A refrigeration unit according to claim 7, wherein said refrigeration unit comprises a refrigerator.

11. A refrigeration unit according to claim 7, wherein said refrigeration unit comprises a heat pump.

12. A refrigeration unit according to claim 7, wherein said refrigeration unit comprises an air conditioner.

13. A refrigeration unit having an adjustable speed drive driven by an electrical power source of predetermined frequency, said refrigeration unit comprising:
   a compressor;
   an electronically commutated motor drivingly connected to said compressor, said motor having a rotor, a stator coil, and an electronic commutator which controls electrical power flow from said electrical power source to said stator coil;
   a commutator controller having a rotor position sensor operatively associated with said electronically commutated motor, said commutator controller generating a switch control signal responsive to a position of said rotor;
   a converter controller electrically connected to said electrical power source, said converter controller generating a phase gating signal having a frequency corresponding to said predetermined frequency and comprising a transition from a first state to a second state at a predetermined time after a zero-crossing of said electrical power source wherein said predetermined time after said zero-crossing is variable in accordance with an operational parameter desired for said electronically commutated motor;
   a circuit electrically connected to both said commutator controller and said converter controller, said circuit combining said switch control signal and said phase gating signal to produce a phase controlled switch signal, and
   wherein said circuit is electrically connected to said electronic commutator to apply said phase controlled switch signal, which is produced by combining said switch control signal and said phase gating signal, to said electronic commutator and control said electronic commutator, thereby controlling said electronically commutated motor.

14. A refrigeration unit according to claim 13, wherein said circuit is an AND gate.

15. A refrigeration unit according to claim 13, said unit further comprising a motor operation signal generator electrically connected to said converter controller, said motor operation signal generator generating a motor operation signal in accordance with an operational parameter desired for said electronically commutated motor.

16. A refrigeration unit according to claim 13, wherein said refrigeration unit comprises a refrigerator.

17. A refrigeration unit according to claim 13, wherein said refrigeration unit comprises a heat pump.

18. A refrigeration unit according to claim 13, wherein said refrigeration unit comprises an air conditioner.

19. An adjustable speed drive driven by an electrical power source of predetermined frequency, said adjustable speed drive comprising:
   an electronically commutated motor having a rotor, a stator coil, and an electronic commutator which controls electrical power flow from said electrical power source to said stator coil;
   means for generating a switch control signal responsive to a position of said rotor;
   means for generating a phase gating signal from said electrical power source of predetermined frequency, said phase gating signal having a frequency corresponding to said predetermined frequency and comprising a transition from a first state to a second state at a predetermined time after a zero-crossing of said electrical power source;
   means for varying said predetermined time after said zero-crossing in accordance with an operational parameter desired for said electronically commutated motor;
   means for combining said switch control signal and said phase gating signal to produce a phase controlled switch signal; and
   means for applying said phase controlled switch signal, which is produced by combining said switch control signal and said phase gating signal, to said electronic commutator to control said electronic commutator, thereby controlling said electronically commutated motor.

20. An adjustable speed drive according to claim 19, wherein said means for generating a phase gating signal comprises a converter controller electrically connected to said electrical power source.

21. An adjustable speed drive according to claim 20, wherein said means for varying said timed relation of said phase gating signal comprises a motor operation signal generator electrically connected to said converter controller, said motor operation signal generator generating a motor operation signal in accordance with an operational parameter desired for said electronically commutated motor.

22. An adjustable speed drive according to claim 19, wherein said means for generating a phase controlled switch signal comprises an AND gate electrically connected to said means for generating a switch control signal and to said means for generating a phase gating signal.

23. A refrigeration unit having an adjustable speed drive driven by an electrical power source of predetermined frequency, said refrigeration unit comprising:
   a fan;
   an electronically commutated motor drivingly connected to said fan, said motor having a rotor, a stator coil, and an electronic commutator for controlling electrical power flow from said electrical power source to said stator coil;
   means for generating a switch control signal responsive to a position of said rotor;
   means for generating a phase gating signal from said electrical power source of predetermined frequency, said phase gating signal having a frequency corresponding to said predetermined frequency and comprising a transition from a first state to a second state at a predetermined time after a zero-crossing of said electrical power source;
   means for varying said predetermined time after said zero-crossing in accordance with an operational parameter desired for said electronically commutated motor;

means for combining said switch control signal and said phase gating signal to produce a phase controlled switch signal; and means for applying said phase controlled switch signal, which is produced by combining said switch control signal and said phase gating signal, to said electronic commutator to control said electronic commutator, thereby controlling said electronically commutated motor.

24. A refrigeration unit according to claim 23, wherein said refrigeration unit comprises a refrigerator.

25. A refrigeration unit according to claim 23, wherein said refrigeration unit comprises a heat pump.

26. A refrigeration unit according to claim 23, wherein said refrigeration unit comprises an air conditioner.

27. A refrigeration unit having an adjustable speed drive driven by an electrical power source of predetermined frequency, said refrigeration unit comprising:

a compressor;

an electronically commutated motor drivingly connected to said compressor, said motor having a rotor, a stator coil, and an electronic commutator for controlling electrical power flow from said electrical power source to said stator coil;

means for generating a switch control signal responsive to a position of said rotor;

means for generating a phase gating signal from said electrical power source of predetermined frequency, said phase gating signal having a frequency corresponding to said predetermined frequency and comprising a transition from a first state to a second state at a predetermined time after a zero-crossing of said electrical power source;

means for varying said predetermined time after a zero-crossing in accordance with an operational parameter desired for said electronically commutated motor;

means for combining said switch control signal and said phase gating signal to produce a phase controlled switch signal; and means for applying said phase controlled switch signal, which is produced by combining said switch control signal and said phase gating signal, to said electronic commutator to control said electronic commutator, thereby controlling said electronically commutated motor.

28. A refrigeration unit according to claim 27, wherein said refrigeration unit comprises a refrigerator.

29. A refrigeration unit according to claim 27, wherein said refrigeration unit comprises a heat pump.

30. A refrigeration unit according to claim 27, wherein said refrigeration unit comprises an air conditioner.

31. An adjustable speed drive driven by an electrical power source of predetermined frequency, said adjustable speed drive comprising:

an electronically commutated motor having a rotor, a stator coil, and an electronic commutator which controls electrical power flow from said electrical power source to said stator coil;

a commutator controller having a rotor position sensor operatively associated with said electronically commutated motor, said commutator controller generating a switch control signal responsive to a position of said rotor;

a converter controller electrically connected to said electrical power source, said converter controller generating a phase gating signal having a frequency corresponding to said predetermined frequency and comprising a transition from a first state to a second state at a predetermined time after a zero-crossing of said electrical power source wherein said predetermined time after said zero-crossing is variable in accordance with an operational parameter desired for said electronically commutated motor;

a circuit electrically connected to both said commutator controller and said converter controller, said circuit generating a phase controlled switch signal responsive to both said switch control signal and said phase gating signal, and wherein said circuit is electrically connected to said electronic commutator to apply said phase controlled switch signal to said electronic commutator and control said electronic commutator, thereby controlling said electronically commutated motor; and wherein said phase gating signal has a frequency two times said predetermined frequency.

32. A refrigeration unit having an adjustable speed drive driven by an electrical power source of predetermined frequency, said refrigeration unit comprising:

a fan;

an electronically commutated motor drivingly connected to said fan, said motor having a rotor, a stator coil, and an electronic commutator which controls electrical power flow from said electrical power source to said stator coil;

a commutator controller having a rotor position sensor operatively associated with said electronically commutated motor said commutator controller generating a switch control signal responsive to a position of said rotor;

a converter controller electrically connected to said electrical power source, said converter controller generating a phase gating signal having a frequency corresponding to said predetermined frequency and comprising a transition from a first state to a second state at a predetermined time after a zero-crossing of said electrical power source wherein said predetermined time after said zero-crossing is variable in accordance with an operational parameter desired for said electronically commutated motor;

a circuit electrically connected to both said commutator controller and said converter controller, said circuit generating a phase controlled switch signal responsive to both said switch control signal and said phase gating signal, and wherein said circuit is electrically connected to said electronic commutator to apply said phase controlled switch signal to said electronic commutator and control said electronic commutator, thereby controlling said electronically commutated motor;

wherein said phase gating signal has a frequency two times said predetermined frequency.

33. A refrigeration unit having an adjustable speed drive driven by an electrical power source of predetermined frequency, said refrigeration unit comprising:

a compressor;

an electronically commutated motor drivingly connected to said compressor, said motor having a rotor, a stator coil, and an electronic commutator which controls electrical power flow from said electrical power source to said stator coil;

a commutator controller having a rotor position sensor operatively associated with said electronically commutated motor, said commutator controller generating a switch control signal responsive to a position of said rotor;

a converter controller electrically connected to said electrical power source, said converter controller generating a phase gating signal having a frequency corresponding to said predetermined frequency and comprising a transition from a first state to a second state at a predetermined time after a zero-crossing of said electrical power source wherein said predetermined time after said zero-crossing is variable in accordance with an operational parameter desired for said electronically commutated motor;

a circuit electrically connected to both said commutator controller and said converter controller, said circuit generating a phase controlled switch signal responsive to both said switch control signal and said phase gating signal, and wherein said circuit is electrically connected to said electronic commutator to apply said phase controlled switch signal to said electronic commutator and control said electronic commutator, thereby controlling said electronically commutated motor; and wherein said phase gating signal has a frequency two times said predetermined frequency.

34. An adjustable speed drive driven by an electrical power source of predetermined frequency, said adjustable speed drive comprising:

an electronically commutated motor having a rotor, a stator coil, and an electronic commutator which controls electrical power flow from said electrical power source to said stator coil;

means for generating a switch control signal responsive to a position of said rotor;

means for generating a phase gating signal from said electrical power source of predetermined frequency, said phase gating signal having a frequency corresponding to said predetermined frequency and comprising a transition from a first state to a second state at a predetermined time after a zero-crossing of said electrical power source;

means for varying said predetermined time after said zero-crossing in accordance with an operational parameter desired for said electronically commutated motor;

means for generating a phase controlled switch signal responsive to both said switch control signal and said phase gating signal; and means for applying said phase controlled switch signal to said electronic commutator to control said electronic commutator, thereby controlling said electronically commutated motor; and wherein said phase gating signal has a frequency two times said predetermined frequency.

35. A refrigeration unit having an adjustable speed drive driven by an electrical power source of predetermined frequency, said refrigeration unit comprising:

a fan;

an electronically commutated motor drivingly connected to said fan, said motor having a rotor, a stator coil, and an electronic commutator for controlling electrical power flow from said electrical power source to said stator coil;

means for generating a switch control signal responsive to a position of said rotor;

means for generating a phase gating signal from said electrical power source of predetermined frequency, said phase gating signal having a frequency corresponding to said predetermined frequency and comprising a transition from a first state to a second state at a predetermined time after a zero-crossing of said electrical power source;

means for varying said predetermined time after said zero-crossing in accordance with an operational parameter desired for said electronically commutated motor;

means for generating a phase controlled switch signal responsive to both said switch control signal and said phase gating signal; and means for applying said phase controlled switch signal to said electronic commutator to control said electronic commutator, thereby controlling said electronically commutated motor;

wherein said phase gating signal has a frequency two times said predetermined frequency.

36. A refrigeration unit having an adjustable speed drive driven by an electrical power source of predetermined frequency, said refrigeration unit comprising:

a compressor;

an electronically commutated motor drivingly connected to said compressor, said motor having a rotor, a stator coil, and an electronic commutator for controlling electrical power flow from said electrical power source to said stator coil;

means for generating a switch control signal responsive to a position of said rotor;

means for generating a phase gating signal from said electrical power source of predetermined frequency, said phase gating signal having a frequency corresponding to said predetermined frequency and comprising a transition from a first state to a second state at a predetermined time after a zero-crossing of said electrical power source;

means for varying said predetermined time after said zero-crossing in accordance with an operational parameter desired for said electronically commutated motor;

means for generating a phase controlled switch signal responsive to both said switch control signal and said phase gating signal; and means for applying said phase controlled switch signal to said electronic commutator to control said electronic commutator, thereby controlling said electronically commutated motor;

wherein said phase gating signal has a frequency two times said predetermined frequency.

\* \* \* \* \*